US005337576A

United States Patent [19]
Dorfman et al.

[11] Patent Number: 5,337,576
[45] Date of Patent: Aug. 16, 1994

[54] REFRIGERANT AND H.V.A.C. DUCTING LEAK DETECTOR

[75] Inventors: Donald Dorfman, Royal Palm Beach; Frank Poma, Delray Beach, both of Fla.

[73] Assignee: Rite Charge Corporation, West Palm Beach, Fla.

[21] Appl. No.: 997,316

[22] Filed: Dec. 28, 1992

[51] Int. Cl.$^5$ ............................................. G08B 19/00
[52] U.S. Cl. ...................................... 62/127; 62/129; 340/607
[58] Field of Search ................ 62/125, 126, 127, 129, 62/130; 236/94; 340/605, 607, 608

[56] References Cited

U.S. PATENT DOCUMENTS

| | | | |
|---|---|---|---|
| 2,230,961 | 2/1941 | Lewis | 177/311 |
| 2,475,069 | 7/1949 | Wood | 177/311 |
| 3,028,586 | 4/1962 | Reda | 62/126 X |
| 3,508,236 | 4/1970 | Adams | 340/240 |
| 3,628,346 | 12/1971 | Lagrone, Jr. | 62/127 X |
| 3,936,284 | 2/1976 | Mason | 340/607 X |
| 3,946,175 | 3/1976 | Sitabkhan | 200/83 |
| 4,040,042 | 8/1977 | Mayer | 340/607 X |
| 4,169,357 | 10/1979 | Kelley | 62/126 |
| 4,387,368 | 6/1983 | Day, III et al. | 62/129 X |
| 4,553,400 | 11/1985 | Branz | 62/127 |
| 4,612,775 | 9/1986 | Branz et al. | 62/126 |
| 4,856,288 | 8/1989 | Weber | 62/129 |
| 4,966,004 | 10/1990 | Midlang et al. | 62/127 X |
| 5,009,076 | 4/1991 | Winslow | 62/129 |
| 5,044,168 | 9/1991 | Wycoff | 62/126 |

Primary Examiner—Harry B. Tanner
Attorney, Agent, or Firm—Malin, Haley, DiMaggio & Crosby

[57] ABSTRACT

An apparatus for detecting a loss of refrigerant and air pressure in a refrigeration/heat pump system having a low pressure refrigerant line and H.V.A.C. ducting, the apparatus comprising: a pressure switch fluidly communicating with the low pressure refrigerant line, responsive to pressure changes therein; a vacuum pressure switch fluidly communicating with a portion of the H.V.A.C. ducting, responsive to air pressure loss therein; a signaling circuit having an enabling DC power supply, operatively associated with the pressure switch and vacuum pressure switch, and two pairs of green and red LEDS for conveying to the operator when the refrigerant pressure drops below a predetermined valve indicating a refrigerant loss or clogged, dirty condenser or evaporator coils, and when air pressure within the H.V.A.C. ducting falls below a predetermined value, indicating a dirty air filter in need of replacement, and a housing for the signaling circuit and respective LED assembly, the signaling circuit including a normally open reed switch which may be selectively enabled by the operator by placing a magnet on the external periphery of the housing.

15 Claims, 3 Drawing Sheets

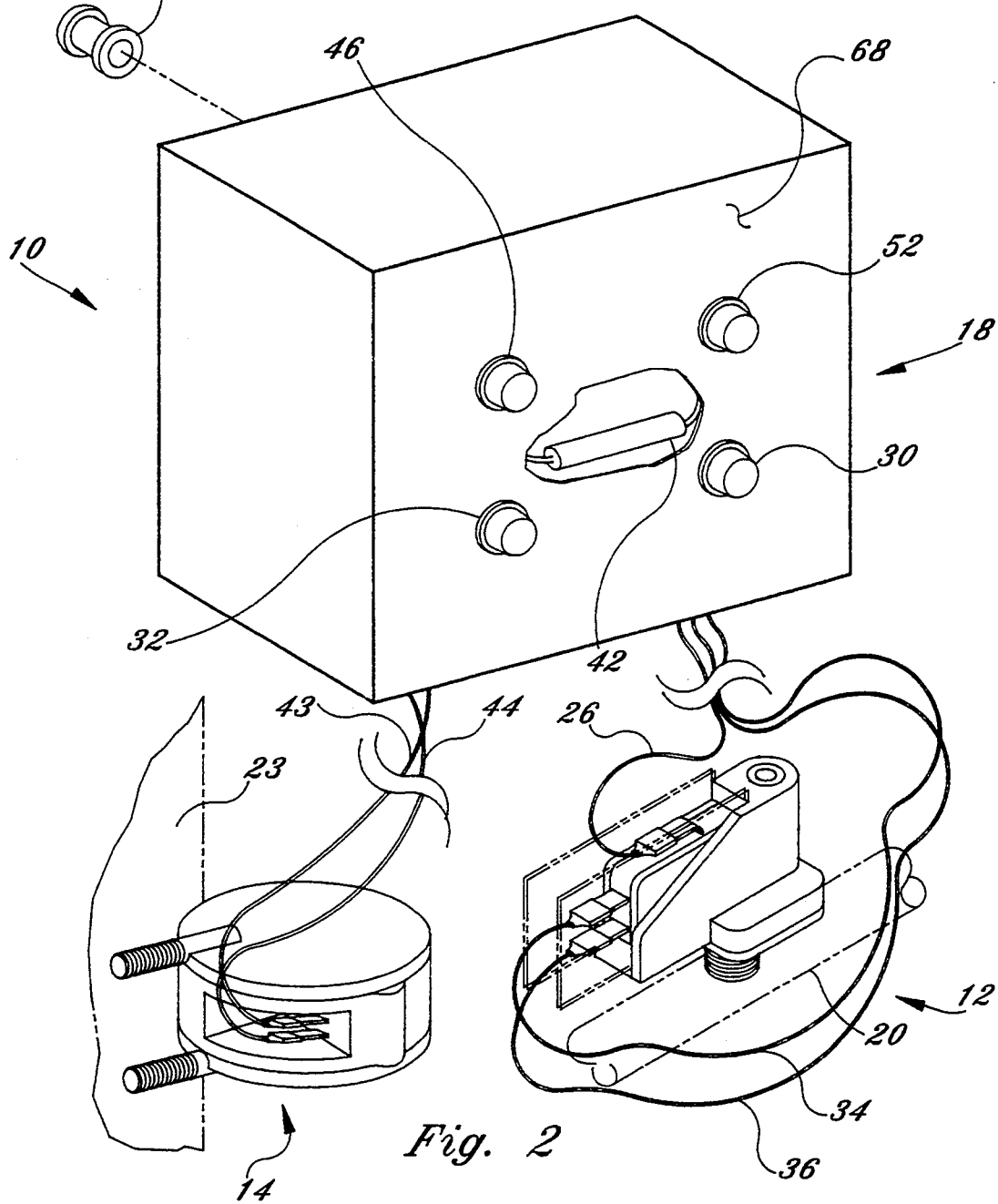

REFRIGERANT AND H.V.A.C. DUCTING LEAK DETECTOR

BACKGROUND OF THE INVENTION

1. Field of the Invention

The present invention relates generally to electromechanical detection devices, and more particularly, to a detector for permanent installation with an air conditioning or heat pump system for conveying to the operator when the pressure of refrigerant therein drops below an acceptable pre-determined range, and when the air pressure within associated H.V.A.C. ducting drops below a threshold value indicating replacement of the air filter is required.

2. Description of the Prior Art

Typical refrigerant devices use a refrigerant such as freon, which can leak out of the system over a period of time or have its flow impeded by clogged evaporator and/or condenser plumbing. The resulting loss in refrigerant initially results in the compressor having to function for extended periods of time to compensate for the loss, resulting in higher electrical bills and reduced system effectiveness. Eventually, the system will cease to function at all. Dirty air filters cause an additional problem, as the flow of air through the evaporator is diminished over time in proportion to dirt accumulation, likewise resulting in loss of system efficiency. In commercial applications in air conditioning installations such as hotels, where each room has its own air conditioning unit, the hotel management normally has no knowledge of system degradation until the hotel guest advises the management that the air conditioning is not functioning. By this time, the air conditioning may have been running inefficiently for an extended period of time.

Accordingly, it would be highly desirable for the housekeeping department to be able to keep advised of the operating condition of the air conditioning systems in each room, without having to resort to extensive maintenance procedures. By employing a detector which may be easily mounted in each room and permanently attached to the air conditioning system, housekeeping can keep abreast of precisely when an individual air conditioning unit requires service. Moreover, by incorporating a magnetically actuated reed switch in the device, it cannot be turned on by hotel guests, but only by the appropriate personnel who have a magnet.

Devices for sensing loss of refrigerant in a refrigerant system are known in the art. U.S. Pat. No. 3,508,236, issued to Adams, discloses a fluid pressure warning device for electromechanically alerting the operator of low refrigerant pressure. U.S. Pat. No. 2,230,961, issued to Lewis, discloses a leak alarm for refrigeration systems, and U.S. Pat. No. 4,612,775, issued to Branz, et al., teaches the use of a refrigeration monitor and alarm system for displaying various system parameters.

None of the foregoing references describe a refrigerant and air pressure loss detector which may be easily mounted in the hotel room or in combination with a central air conditioning unit, and selectively actuated by a magnetic reed switch.

SUMMARY OF THE INVENTION

The instant invention is directed to a detector for use in combination with a refrigerant/heat pump system for signaling a loss of refrigerant in a low pressure refrigerant line, and air pressure within H.V.A.C. ducting due to dirty or clogged air filters. The detector is generally comprised of a display box which may be conveniently mounted on a support surface for easy viewing, and a pair of electrically connected pressure switches for sensing refrigerant pressure and air pressure, respectively.

The display box forms a suitable housing for the signaling components which in the preferred embodiment, comprise two pairs of LEDs, green and red, each pair electrically associated with each pressure switch through a signaling circuit to convey the status of the refrigerant and air pressure, respectively. The signaling circuit is energized by a conventional 9-volt battery, which may be stored within the signaling box, and which enables the circuit through a step-down resister. If an AC external power source is desired, the circuit may run on a 24-volt DC power source utilizing a suitable step-down transformer, voltage rectifier, and resister. The circuit is enabled by a main momentary switch which is normally open. In a preferred embodiment, the main switch is a reed switch responsive to a magnetic field. The reed switch is disposed within the display box such that it may be magnetically actuated by placing a magnet against the external periphery of the box.

A pressure switch fluidly communicating with the low pressure refrigerant line is electrically associated with the signaling circuit. The pressure switch includes an access valve which may be tapped into the low pressure refrigerant line in the system, and in one embodiment additionally includes a double-pull, double-throw, pressure actuated depressor switch. The switch is calibrated for a pre-determined cut-out/cut-in pressure range, for example, 45–65 or 55–75 psi. When the refrigerant pressure is within the selected range, the switch will be biased into a first, closed position, thereby energizing the signaling circuit such that the green LED of the first LED pair will be illuminated, indicating that the refrigerant pressure is within an acceptable range. When the refrigerant pressure drops below the threshold value, the depressor switch will be biased into a second, closed position, thereby shunting current within the signaling circuit to the red LED in lieu of the green LED, indicating a loss in refrigerant pressure requiring maintenance.

The second pressure switch comprises a vacuum sensor which is fluidly connected to the system's H.V.A.C. ducting, and functions in a manner similar to the first pressure switch. When the air filter becomes clogged due to excessive dirt buildup over time, the flow of air therethrough will become impeded, causing an air pressure drop through the H.V.A.C. ducting. The vacuum sensor is calibrated to a predetermined threshold value. When the pressure drops below the threshold value, a normally open switch electrically associated with the signaling circuit shunts current from the second green LED which when activated, indicates that the air pressure in the H.V.A.C. ducting is normal, to the second red LED, indicating that the air filter is dirty and requires replacement.

If desired, a plurality of LEDs associated with a potentiometer-type pressure sensor may be employed to indicate a numerical percentage of loss, rather than just indicate loss when the pressure diminishes below a threshold value. An audible alarm may also be added to the signaling circuit in parallel with the respective red LED indicators, to provide an audible, as well as visual warning.

In accordance with the instant invention, it is an object thereof to provide a detector for detecting a loss of refrigerant in a refrigeration/heat pump system.

It is another object of the present invention to provide a detector for detecting a loss of air pressure in the H.V.A.C. ducting of a refrigerant/heat pump system.

It is yet another object of the invention to provide a detector which may only be selectively actuated by external placement of a magnet thereon.

In accordance with these and other objects which will become apparent hereinafter, the invention will now be described with particular reference to the accompanying drawings.

BRIEF DESCRIPTION OF THE DRAWINGS

FIG. 2 is an isometric view of the entire assembly of the refrigerant/air pressure loss detector; and FIG. 3 is an exploded view of the LED assembly.

DESCRIPTION OF THE PREFERRED EMBODIMENT

Figure 1:
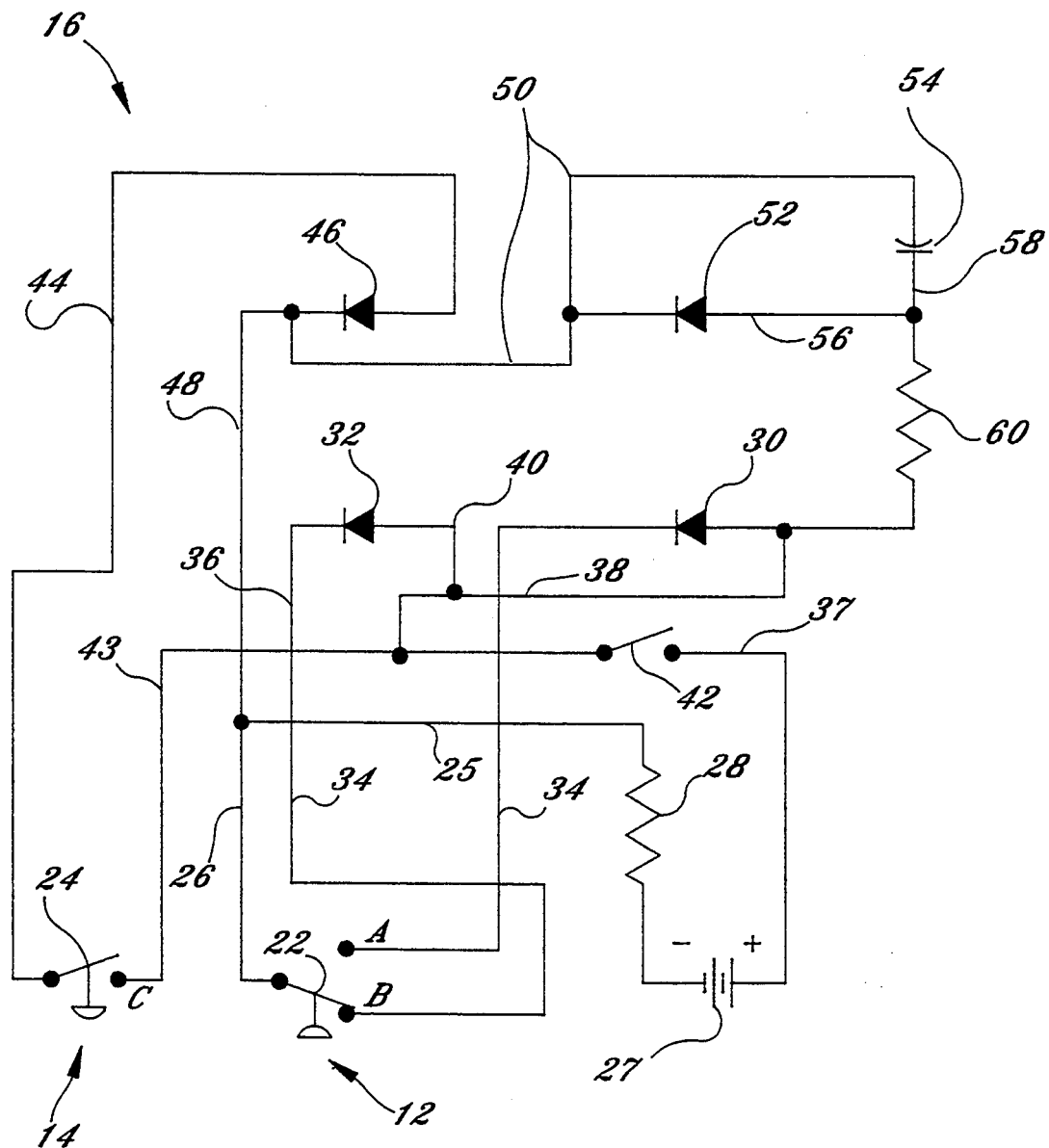
FIG. 1 is an electrical schematic of the refrigerant/air pressure loss detector system.

With specific reference to the several views of the drawings, there is depicted a refrigerant and air flow loss detector denoted by the reference numeral 10, generally comprised of a pair of pressure switches 12 and 14, electrical signaling circuit 16, and display box 18.

Pressure switch 12 fluidly communicates with low pressure refrigerant line 20, and is of the type well known in the art, having an SPDT type connection. In one embodiment, pressure switch 12 comprises an internal double throw, double pull switch 22, shown schematically in FIG. 1, which may be biased between contacts A and B, dependent upon the calibrated cut-out/cut-in pressure range. When the refrigerant within low pressure line 20 is within an acceptable range, switch 22 is biased against contact A. When the refrigerant pressure drops below the threshold value, switch 22 is urged into a second position against contact B.

Pressure switch 14 is of the vacuum type for sensing a negative pressure differential, and fluidly communicates with a portion of the H.V.A.C. ducting 23 in the refrigeration system. Pressure switch 14 includes an internal normally open switch 24, shown schematically in FIG. 1 which is biased against contact C when the switch senses an air pressure drop below an acceptable pre-determined value, indicating that the system air filter has become dirty and in need of replacement.

Pressure switches 12 and 14 are electrically associated with signaling circuit 16 as illustrated in the schematic depicted in FIG. 1. Pressure switch 12 is connected to signaling circuit 16 by wire 26 which is attached to wire 25 leading from the −V terminal of a 9-volt DC power source 27 through step-down resister 28. Contacts A and B are each wired in series to the −V terminals of green LED and red LED, 30 and 32 through wires 34 and 36, respectively. The +V terminals of LED 30 and LED 32 are both wired in parallel to wire 37 which leads to the +V terminal of power source 27. Disposed between power source 27 and wires 38 and 40, is a main momentary switch 42. In a preferred embodiment, main switch 42 is a magnetically actuated normally open reed switch 42, which enables signaling circuit 16 when a magnet is placed nearby. However, main switch 42 may be a pressure sensitive switch, a toggle switch, a micro switch, or any suitable momentary switch.

When pressure switch 12 senses refrigerant pressure in line 20 to be within the acceptable range, switch 22 is normally closed against contact B. When a magnet is placed near reed switch 42, causing it to close, circuit 16 is energized and the green LED 30 will illuminate signaling the operator that the refrigerant pressure is normal. When pressure switch 12 detects a refrigerant pressure loss below an acceptable preset value, switch 22 will move from contact A to B, thus shunting current from green LED 30 to red LED 32, indicating a loss of refrigerant which requires maintenance.

Pressure switch 14 is connected to signaling circuit 16 by wire 43 from +V terminal wire 37, and wire 44 which is attached to the +V terminal of red LED 46. The −V terminal of red LED 46 is attached to wire 25 by wire 48. Wire 48 is also attached in parallel to wire 50 which is attached in parallel to the −V terminal of green LED 52 and capacitor 54. The +V terminals of green LED 52 and capacitor 54 are joined together by wires 56 and 58, respectively, the combination of which is connected to the −V terminal of resister 60. The +V terminal of resister 60 is attached to wire 38. When pressure switch 14 detects normal air pressure values within H.V.A.C. duct 23, switch 24 is normally open so current will flow through green LED 52. Capacitor 54 ensures that green LED 52 remains illuminated until switch 24 is fully closed by a drop in air pressure past the pre-set threshold value at which time red LED 46 will illuminate indicating an air pressure loss in the H.V.A.C. duct requiring replacement of the air filter, and disabling green LED 52.

In an alternative embodiment, the signaling circuit may be configured to operate in conjunction with an external AC power source attached to an appropriate step-down transformer, voltage rectifier, and resister to provide a 24-volt DC operating current, within the scope of the invention.

Referring now to FIG. 2, the entire assembly 10 is depicted. Display box 18 functions as a housing for signaling circuit 16 in both pairs of LEDs 30, 32, and 46, 54. A typical LED assembly comprising an LED, holder 62, nut 64, and rubber insert 66 is illustrated in FIG. 3. Each LED assembly is disposed in the forward face 68 of display box 18 for easy viewing by the operator. Reed switch 42 is attached to the interior side of forward face 68 so that it may be conveniently actuated by placing a magnet against the exterior of face 68. A bracket or grommet 70 may be attached to the rear of box 18 to facilitate attachment to a support surface such as a wall.

Figure 4:
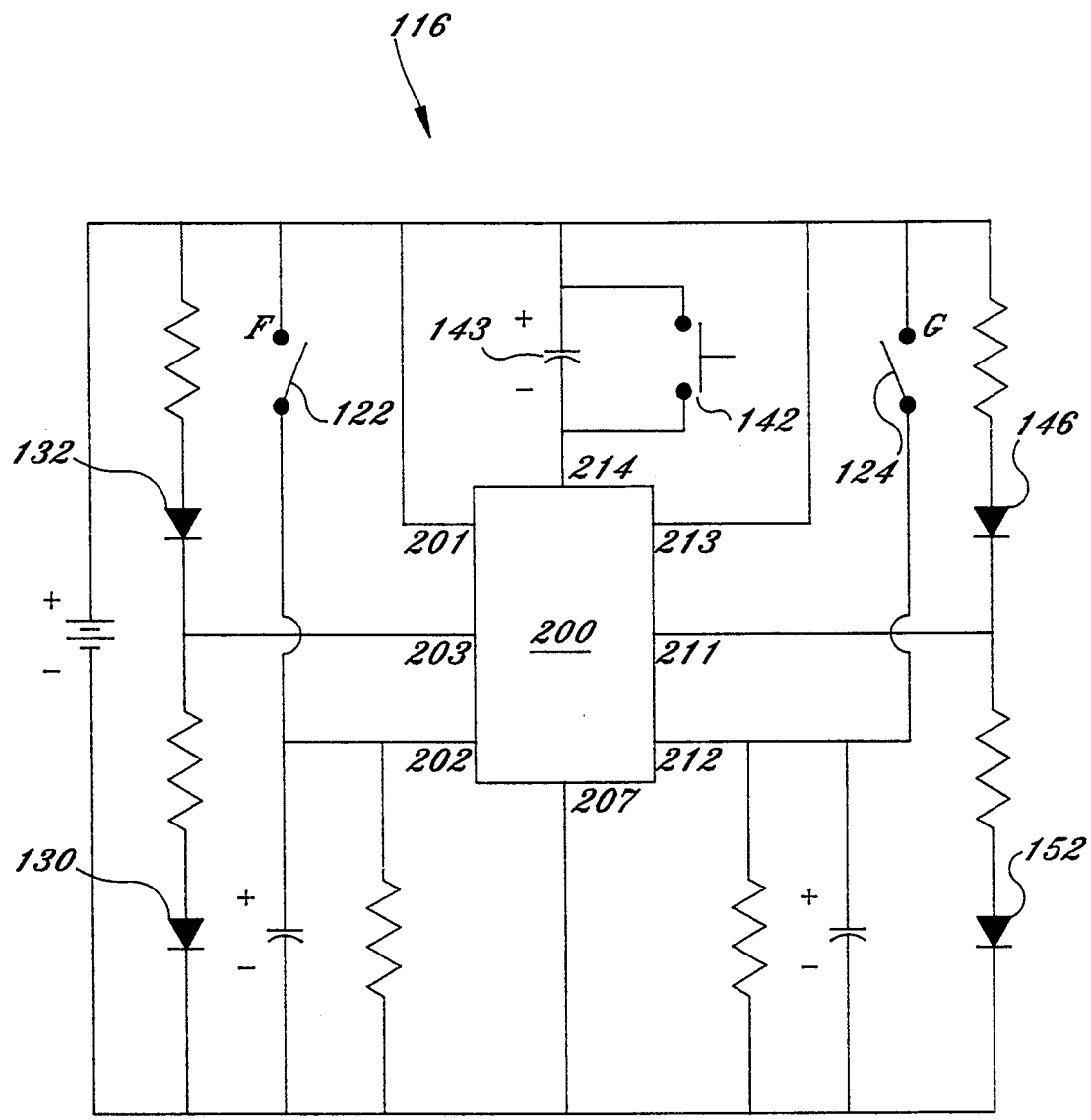
FIG. 4 is an electrical schematic of an alternate embodiment of the refrigerant/air pressure loss detector system.

Referring now to FIG. 4, an alternate embodiment of the refrigerant/air pressure loss detector system is shown utilizing an integrated circuit ("IC") 200 as part of the signaling circuit 116. In this embodiment, IC 200 is a CMOS, two input, quad nand gate chip.

Pressure switch 112 (not shown) includes an internal, normally open detection switch 122, shown schematically in FIG. 4 which is biased against contact F when the switch senses a refrigerant pressure drop below an acceptable predetermined value, indicating a loss of refrigerant which requires maintenance.

Pressure switch 114 (not shown) includes an internal, normally open detection switch 124, shown schematically in FIG. 4 which is biased against contact G when the switch senses an air pressure drop below an acceptable predetermined value, indicating that the system's air filter has become dirty and is in need of replacement.

Upon activation of main momentary switch 142, which in the preferred embodiment is a magnetically actuated reed switch, but which may be any suitable momentary switch, such as a push bottom or micro switch, current flows from pin 207 through pin 214 of the IC 200, until capacitor 143 is fully charged. With both detection switches 122 and 124 open at initial power up, pins 201 and 213 are high, causing pins 203 and 211 to be high, thus illuminating green LEDs 130 and 152, respectively, indicating that there are no faults in the system.

Closure of a detection switch 122, 124 will result in the opposite state, illuminating the red LED 132, 146 associated with that detection switch, thereby indicating that maintenance is required.

Once the red or fault mode is detected, the RC networks on pins 202 and 212 hold that state until the end of the circuit operating cycle. This is to assure that no erroneous conditions, such as switch bounce, etc., will change the detected state.

The present invention has been disclosed in what is considered to be the most practical and preferred embodiment. It is recognized, however, that departures may be made therefrom and that obvious modifications will occur to a person skilled in the art.

What is claimed is:

1. An apparatus for detecting a loss of refrigerant in a refrigeration/heat pump system having a low pressure refrigerant line, comprising:
    a pressure switch fluidly communicating with said low pressure refrigerant line, responsive to pressure changes therein;
    an electrical signaling circuit having an enabling power supply, operatively associated with said pressure switch, said signaling circuit comprising a main momentary switch;
    first means for indicating when said refrigerant in said low pressure line is within a predetermined range, said first means for indicating electrically associated with said signaling circuit;
    second means for indicating when said refrigerant in said low pressure line is beyond a predetermined range, said second means for indicating electrically associated with said signaling circuit;
    said main momentary switch operatively associated with said power supply to energize either said first means for indicating or said second means for indicating; and
    means for housing said signaling circuit, and said first and second indicating means, said housing having means for mounting thereof on a support surface, whereby said housing may be mounted on said support surface so that said apparatus may easily convey to an operator upon actuation of said main switch, the status of said refrigerant pressure within said low pressure line by selectively enabling either said first or second indicating means.

2. The apparatus for detecting a loss of refrigerant as recited in claim 1, wherein said main momentary switch is a pressure sensitive switch.

3. The apparatus for detecting a loss of refrigerant as recited in claim 1, wherein said main momentary switch is a toggle switch.

4. The apparatus for detecting a loss of refrigerant as recited in claim 1, wherein said main momentary switch is a micro switch.

5. The apparatus for detecting a loss of refrigerant as recited in claim 1, wherein said first means for indicating comprises a green LED.

6. The apparatus for detecting a loss of refrigerant as recited in claim 1, wherein said second means for indicating comprises a red LED.

7. The apparatus for detecting a loss of refrigerant as recited in claim 1, further comprising means for detecting a loss in air pressure in the H.V.A.C. ducting is said refrigeration/heat pump system caused by a dirty air filter, said means for detecting a loss in air pressure comprising:
    a vacuum pressure switch, said vacuum pressure switch fluidly communicating with said H.V.A.C. ducting, responsive to air pressure losses therein, said vacuum pressure switch including a normally open switch operatively associated with said signaling circuit;
    third means for indicating when said air pressure within said H.V.A.C. ducting is above an acceptable threshold value; and
    fourth means for indicating when said air pressure in said H.V.A.C. ducting drops below said threshold value, said third and fourth means for indicating comprising green and red LEDs, respectively;
    said main momentary switch operatively associated with said power supply to energize either said third means for indicating or said fourth means for indicating.

8. The apparatus for detecting a loss of refrigerant as recited in claim 1, wherein said main momentary switch is a magnetically actuated reed switch.

9. An apparatus for detecting a loss of refrigerant and air pressure in a refrigeration/heat pump system having a low pressure refrigerant line and H.V.A.C. ducting, comprising:
    a pressure switch fluidly communicating with said low pressure refrigerant line, responsive to pressure changes therein;
    a vacuum pressure switch fluidly communicating with said H.V.A.C. ducting, responsive to air pressure losses therein;
    an electrical signaling circuit having an enabling power supply, operatively associated with said pressure switch and said vacuum pressure switch, said signaling circuit comprising a main momentary switch;
    first means for indicating when said refrigerant in said low pressure line is within a predetermined range, said first means for indicating comprising a green LED electrically associated with said signaling circuit;
    second means for indicating when said refrigerant in said low pressure line is beyond a predetermined range, said second means for indicating comprising a red LED electrically associated with said signaling circuit;
    third means for indicating when said air pressure within said H.V.A.C. ducting is above an acceptable threshold value, said third means for indicating comprising a green LED electrically associated with said signaling circuit;
    fourth means for indicating when said air pressure within said H.V.A.C. ducting drops below said threshold value, said fourth means for indicating comprising a red LED electrically associated with said signaling circuit; and means for housing said signaling circuit and said first, second, third and fourth indicating means, said housing defining an internal cavity and external periphery, wherein when said main momentary switch is actuated, said signaling circuit is energized which, dependent upon the switch position in said pressure switch and the switch position in said vacuum pressure switch, will enable either said first or second, and said third or fourth indicating means to convey the status of said refrigerant and air pressure in said low pressure refrigerant line and said H.V.A.C. ducting, respectively, said main momentary switch operatively associated with said power supply to energize either said first means for indicating or said second means for indicating and either said third means for indicating or said fourth means for indicating.

10. The apparatus for detecting a loss of refrigerant as recited in claim 9, wherein said main momentary switch is a pressure sensitive switch.

11. The apparatus for detecting a loss of refrigerant as recited in claim 9, wherein said main momentary switch is a toggle switch.

12. The apparatus for detecting a loss of refrigerant as recited in claim 9, wherein said main momentary switch is a micro switch.

13. The apparatus for detecting a loss of refrigerant as recited in claim 9, wherein said main momentary switch is a magnetically actuated reed switch.

14. An apparatus for detecting a loss of refrigerant and air pressure in a refrigeration/heat pump system having a low pressure refrigerant line and H.V.A.C. ducting, comprising:

a pressure switch fluidly communicating with said low pressure refrigerant line, responsive to pressure changes therein;

a vacuum pressure switch fluidly communicating with said H.V.A.C. ducting, responsive to air pressure losses therein;

an electrical signaling circuit having an enabling power supply, operatively associated with said pressure switch and said vacuum pressure switch, said signaling circuit comprising a magnetically actuated reed switch;

first means for indicating when said refrigerant in said low pressure line is within a predetermined range, said first means for indicating comprising a green LED electrically associated with said signaling circuit;

second means for indicating when said refrigerant in said low pressure line is beyond a predetermined range, said second means for indicating comprising a red LED electrically associated with said signaling circuit.

third means for indicating when said air pressure within said H.V.A.C. ducting is above an acceptable threshold value, said third means for indicating comprising a green LED electrically associated with said signaling circuit;

fourth means for indicating when said air pressure within said H.V.A.C. ducting drops below said threshold value, said fourth means for indicating comprising a red LED electrically associated with said signaling circuit; and means for housing said signaling circuit and said first, second, third and fourth indicating means, said housing defining an internal cavity and external periphery, wherein said reed switch is disposed within said cavity such that it may be magnetically actuated by placing a magnet against said external periphery of said housing, thereby energizing said signaling circuit which, dependent upon the switch position in said pressure switch and the switch position in said vacuum pressure switch, will enable either said first or second, and said third or fourth indicating means to convey the status of said refrigerant and air pressure in said low pressure refrigerant line and said H.V.A.C. ducting, respectively.

15. An apparatus for detecting a loss of refrigerant in a refrigeration/heat pump system having a low pressure refrigerant line, comprising:

a pressure switch fluidly communicating with said low pressure refrigerant line, responsive to pressure changes therein;

an electrical signaling circuit having an enabling power supply, operatively associated with said pressure switch, said signaling circuit comprising a main momentary switch, wherein said main momentary switch is a magnetically actuated reed switch;

first means for indicating when said refrigerant in said low pressure line is within a predetermined range, said first means for indicating electrically associated with said signaling circuit;

second means for indicating when said refrigerant in said means to convey the status of said refrigerant and air pressure in said low pressure refrigerant line and said H.V.A.C. ducting, respectively, said main momentary switch operatively associated with said power supply to energize either said first means for indicating or said second means for indicating and either said third means for indicating or said fourth means for indicating.

* * * * *